(12) United States Patent
Oner et al.

(10) Patent No.: US 7,243,172 B2
(45) Date of Patent: Jul. 10, 2007

(54) FRAGMENT STORAGE FOR DATA ALIGNMENT AND MERGER

(75) Inventors: Koray Oner, Sunnyvale, CA (US); Laurent Moll, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 399 days.

(21) Appl. No.: 10/685,129

(22) Filed: Oct. 14, 2003

(65) Prior Publication Data

US 2005/0080953 A1    Apr. 14, 2005

(51) Int. Cl.
*G06F 13/38* (2006.01)

(52) U.S. Cl. .................... 710/66; 710/307; 710/52

(58) Field of Classification Search ............ 710/5, 710/29, 33, 62; 709/233; 712/405
See application file for complete search history.

(56) References Cited

U.S. PATENT DOCUMENTS

| | | | |
|---|---|---|---|
| 6,188,699 B1 * | 2/2001 | Lang et al. ............... | 370/463 |
| 6,414,609 B1 * | 7/2002 | Zukawa et al. ........... | 341/67 |
| 2004/0034828 A1 * | 2/2004 | Hocevar .................. | 714/800 |

OTHER PUBLICATIONS

C. D. Cranor et al., "Architectural Considerations for CPU and Network Interface Integration," http://chuck.cranor.org/p/unum_hoti99.pdf, printed Feb. 15, 2005.
C.D. Cranor et al. "Architectural Considerations for CPU and Network Interface Integration," http://chuck.cranor.org/p/unum_slides_hoti99.pdf, printed Feb. 15, 2005.
C.D. Cranor et al., "Architectural Considerations for CPU and Network Interface Integration," IEEE Micro Chips, Systems, Software, and Applications, Jan./Feb. 2000, pp. 18-26.

* cited by examiner

*Primary Examiner*—Ilwoo Park
(74) *Attorney, Agent, or Firm*—Garlick Harrison & Markison; Bruce E. Garlick

(57) ABSTRACT

A multiprocessor switching device substantially implemented on a single CMOS integrated circuit is described in connection with a packet data transfer circuit that uses a fragment storage buffer to align and/or merge data being transferred to or from memory on a plurality of channels. In a packet reception embodiment, a data shifter and fragment store buffer are used to align received packet data to any required offset. The aligned data may and then be written to the system bus or combined with data fragments from prior data cycles before being written to the system bus. When packet data is being transferred to memory on a plurality of channels, the fragment storage may be channelized using register files or flip-flops to store intermediate values of packets and states for each channel.

6 Claims, 10 Drawing Sheets

FRAGMENT STORAGE FOR DATA ALIGNMENT AND MERGER

RELATED APPLICATIONS

This application is related to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002, U.S. Provisional Patent Application Ser. No. 60/348,717, filed Jan. 14, 2002, U.S. patent application Ser. No. 10/270,016, filed Oct. 11, 2002 and U.S. patent application Ser. No. 10/269,666, filed Oct. 11, 2002, each of which is incorporated herein by reference in its entirety.

BACKGROUND OF THE INVENTION

1. Field of the Invention

The present invention is directed in general to data communications. In one aspect, the present invention relates to a method and system for improving memory read and write operations in microprocessor or multiprocessor computer devices.

2. Related Art

As is known, communication technologies that link electronic devices may use computer system switching devices to route and process signal information. Some communication technologies interface one or more processor devices for processing packet-based signals in a network of computer systems, and typically include one or more receive/transmit interfaces. These interfaces generally function to convert data from a high-speed communication protocol (e.g., HT, SPI, etc.) utilized between processor devices and the generic format of data utilized within the processor device. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol.

Each interface typically includes a dedicated DMA engine used to transmit received packets from the receive interface to memory in the system over a system or memory bus, and to transmit packets from the memory over the memory bus to the transmit interface for transmission. If a given system includes two or more packet interfaces, the system includes DMA engines for each interface. Such conventional systems typically include an I/O bus (for example, in the receive interface) that has the same width as the memory bus, making for straightforward transfers between the busses. But where the data to be written to or read from memory does not match or align with the memory block size (such as occurs when descriptors are used to point to multiple cache buffers storing a data packet), the DMA engine in such conventional systems must perform a Read-Modify-Write (RMW) operation in order to write the data back to the memory. This requires the DMA engine to wait for reads from the main memory for each RMW operation, thereby degrading the speed and performance of the DMA engine. For data read operations, data from memory must be converted to fit the bus width requirements of the transmit interface. When multiple channels are executing DMA transfers, an additional challenge is posed by having to maintain partial results for all active channels.

Therefore, a need exists for methods and/or apparatuses for improving the processing of memory transfers to quickly and efficiently transfer data to and from memory. Further limitations and disadvantages of conventional systems will become apparent to one of skill in the art after reviewing the remainder of the present application with reference to the drawings and detailed description which follow.

SUMMARY OF THE INVENTION

In accordance with the present invention, an integrated circuit system and method are provided for merging and aligning multiple packet fragments to memory by using a fragment storage buffer to hold overflow data that is shifted into alignment with data from the next packet fragment so that packet fragments from each channel are merged so that they can be stored in continuous memory locations where possible. In addition, packet fragments stored in memory may be arbitrarily aligned to any position in memory by using a data shifter prior to storage in memory. Where data transfer under multiple channels is supported, the fragment storage buffer is divided into multiple regions which are used to store incoming packet fragments for each channel.

In a selected embodiment, an integrated circuit multiprocessor switching device is provided for transferring data from a first bus to a memory bus. Packet data received on a first bus having a first data width is translated for transmission to a memory bus having a second data width that may be larger or smaller than the first data width. To implement this translation, a packet manager transfers data received from the first interface circuit to memory under control of at least a first descriptor using an input buffer, such as a FIFO butter, coupled to the first bus. In response to offset information contained in the descriptor, an alignment circuit in the packet manager shifts packet fragments stored in the input buffer to output shifted data. In addition, a data merge circuit in the packet manager uses a fragment storage register to store fragment data, and merges output shifted data from one data cycle with fragment data stored in a fragment storage register from a previous cycle to form a merged data value that is written to the memory bus. In a selected embodiment, the present invention is implemented as a packet manager input circuit in which the first bus and input buffer have a line width of 16 B, and the memory bus has a line width of 32 B. The present invention may also be used for translating memory buffers to output buffers during read operations. In a selected embodiment, data may be transferred on a plurality of channels from the first bus to the memory bus by constructing the input buffer of a buffer region for each of the plurality of channels. In this case, register files may store intermediate values of packets and states for the plurality of channels.

In an alternate selected embodiment, a method is provided for aligning and merging packet data received on at least a first channel from a first bus to a second bus in an integrated circuit. During a first data cycle, input data having a first line width is received from the first bus and shift rotated to generate a first shifted data and a first fragment data which may be stored in separate registers or buffers. The shifting may be controlled by an offset value contained in a first descriptor. This data is merged or combined with shifted data from a second input data received from the first bus to form a merged output data value for transmission to the second bus. This method may be used to translate data when the first bus is larger than the second bus, or when first bus is smaller than the second bus.

The objects, advantages and other novel features of the present invention will be apparent from the following detailed description when read in conjunction with the appended claims and attached drawings.

DETAILED DESCRIPTION

Figure 1:
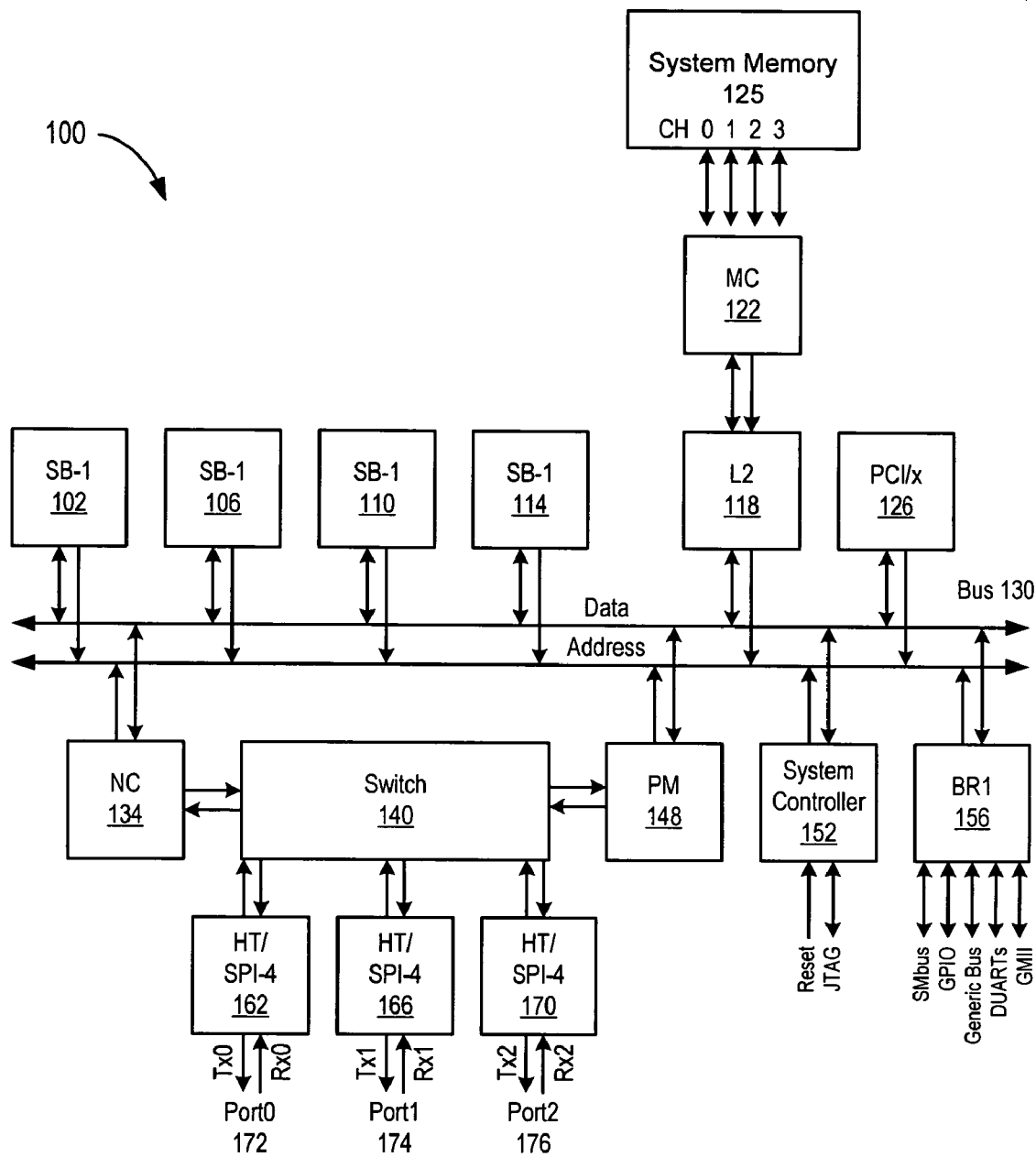
FIG. 1 shows a block diagram of a network multiprocessor switching system-on-a-chip.

An apparatus and method in accordance with the present invention provide a system for storing incoming packets in memory and transmitting outgoing packets from memory through a multiprocessor switching system-on-a-chip. A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152 and a plurality of configurable packet based interfaces 162, 166, 170, such as three flexible HyperTransport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions. With respect to the processing system example of FIG. 2, each processing unit 260, 261, 262, 263 may be a destination within multiprocessor device 100 and/or each processing function executed by the processing modules 260, 261, 262, 263 may be a source within the processor device 100.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals (e.g., 265 in FIG. 2), including a PCI/PCI-X interface 126 and the input/output bridge interface 156 for the generic bus, SMbus, UARTs, GOIP and Ethernet MAC.

The cache memory 118 258 may function as an L2 cache for the processing units 102, 106, 110,114, node controller 134 and/or packet manager 148. With respect to the processing system example of FIG. 2, the cache memory 258 may be a destination within multiprocessor device 215.

The memory controller 122 provides an interface to system memory, which, when the multiprocessor device 100 is an integrated circuit, may be off-chip and/or on-chip. With respect to the processing system example of FIG. 2, the system memory may be a destination within the multiprocessor device 100 and/or memory locations within the system memory may be individual destinations within the device 100 (as illustrated with channels 0-3). Accordingly, the system memory may include one or more destinations for the multi-node processing systems. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output each having its own DMA engine and associated cache memory. The cache memory may be arranged as first in first out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three HyperTransport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransport (HT) mode, in which case, it uses a special extension called Packet-over-HT (PoHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 (or 346 in FIG. 3) is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as with an interrupt mapper 370 in the packet manager 320 or with an address map 339 in the packet-based interfaces 330, 331, 332 illustrated in FIG. 3. The system controller 152 or 346 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 or 346 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager 320 with interrupt channel and source information stored in configuration status registers, the interrupt mapper 370 can mask events and vector interrupts to their final destination using at most two CSR read operations by the processor, although additional mapping 380 can be done in the system controller 152 or 346.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independent of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, and the packet interface circuits 162, 166, 170 may be tightly coupled to receive packets, process them, and forward the packets on (if necessary).

The tight coupling may be manifest in several fashions. For example, the interrupts may be tightly coupled. An I/O device (e.g., the packet interface circuits 162, 166, 170) may request an interrupt which is mapped (via an interrupt map 370 or 380 in the packet manager 320 or system controller 346 shown in FIG. 3) to one of the processors 102, 106, 110, 114. The transmission of the interrupt to the processor may be rapid since the signals may be transmitted at the clock frequency of the integrated circuit comprising the system 100 (as opposed to interconnecting separate integrated circuits). When the processor (e.g., 102) executes the interrupt service routine, typically one or more status registers in the system controller 152 and/or the interrupting device are read. These status register reads may occur with relatively low latency across the bus 130 (as opposed to, for example, a high latency peripheral bus such as PCI). The latency of the status register reads may, in some embodiments, be one or more orders of magnitude less than that of a peripheral bus such as PCI.

As will be understood, the multiprocessor device 100 of the present invention provides multiprocessing functionality on its own which makes it suitable for scientific and embedded applications requiring significant computational capabilities. In a selected embodiment, the multiprocessor device (e.g., 100, 215) of the present invention contains a number of peripherals along with its sophisticated memory and communication support. For example, in a selected embodiment, the processor cores (e.g., 102 or 260) are 0.8 to 1.2-GHz, 64-bit MIPS with 64 kbytes of level one cache memory per processor and 1 Mbyte of level two cache 118 or 258 per chip; an 800-MHz DDR controller 122 or 264; off-chip ccNUMA support and optional ECC support. Three 8/16-bit receive/transmit ports 162, 166, 170 (or 250, 252, 254) are also provided that are configurable as either Hyper-Transport or SPI-4 links. Additional peripheral features 265 include a 32-bit 33/66-MHz PCI interface or 64-bit 133 MHz PCI/x interface 126; an input/output bridge 156 that includes a 10/100/1000 Ethernet MAC interface, general-purpose I/O ports, SMBus serial interfaces and four DUARTs.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs), and may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
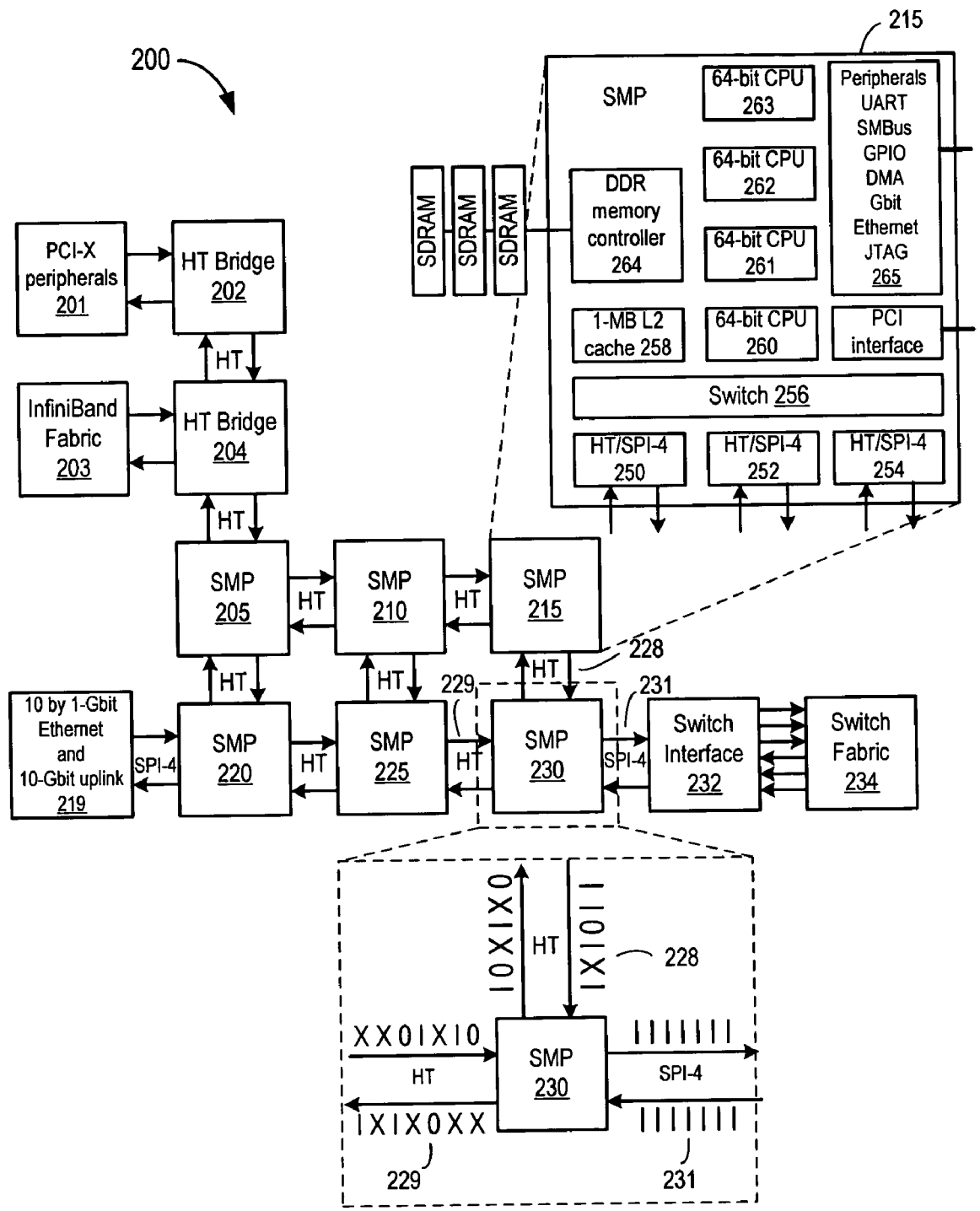
FIG. 2 depicts an example multiprocessor switch application of the present invention.

FIG. 2 depicts an example multiprocessor switch application 200 of the present invention showing how the HyperTransport/SPI-4 link architecture can be used in communication and multichip multiprocessing support. As illustrated, each link (e.g., 250, 252, 254) can be configured as an 8- or 16-bit HyperTransport connection, or as a streaming SPI-4 interface. In addition, each link includes hardware hash and route acceleration functions, whereby routing information for an incoming packet are calculated. The routing information determines how a packet will steer through the internal switch (e.g., 256) of a multiprocessor device (e.g., 205, 210, 215, 220, 225, 230). The destination through the switch can be either an output port or the packet manager input. Generally speaking, the steering is accomplished by translating header information from a packet (along with other input data) to an output virtual channel (OVC). In addition, the HyperTransport links (e.g., 250, 252, 254) work with a mix of HyperTransport transactions, including encapsulated SPI-4 packets and nonlocal NUMA memory access.

Large amounts of streaming data can also be handled when a port (e.g., 231) is set up as an SPI-4 link. This is ideal for high-speed communication environments. It can supply a link to external communication connections that have a native SPI-4 interface like Ethernet MACs 219 or to switch-fabric interface chips 232, 234.

As illustrated in FIG. 2, three HyperTransport links (e.g., 228, 229, 231) enable an expandable system. Two links (e.g., 228, 229) are needed for a pass-through architecture where multiple units (225, 230, 215) are daisy-chained together. In this configuration, the links 228, 229 between multiprocessor units carry HT I/O packets (indicated as "X" data in FIG. 2), ccNUMA packets (indicated as "0" data in FIG. 2) and/or SPI-4 packets (indicated as "I" data in FIG. 2). The pass-through architecture is ideal for processing as data moves along the chain. Unfortunately, implementing the same links for NUMA transfers will reduce the bandwidth available for other traffic. It is possible to link a pair of chips using the third link for NUMA transfers if the daisy-chained link bandwidth is needed for I/O or network packets. A third link allows the nodes in the array to extend in another direction. This can work in two ways. It can supply another path for a daisy-chain architecture. It can also provide additional processors to work on data forwarded from the daisy-chain data stream. This is great for such applications as the VPN processing that is handed off to additional processing nodes. Alternatively, when the third link (e.g., 231) is used to connect the multiprocessor unit 230 to an external switch interface 232, the third link carries SPI-4 packets (indicated as "I" data in FIG. 2).

Figure 3:
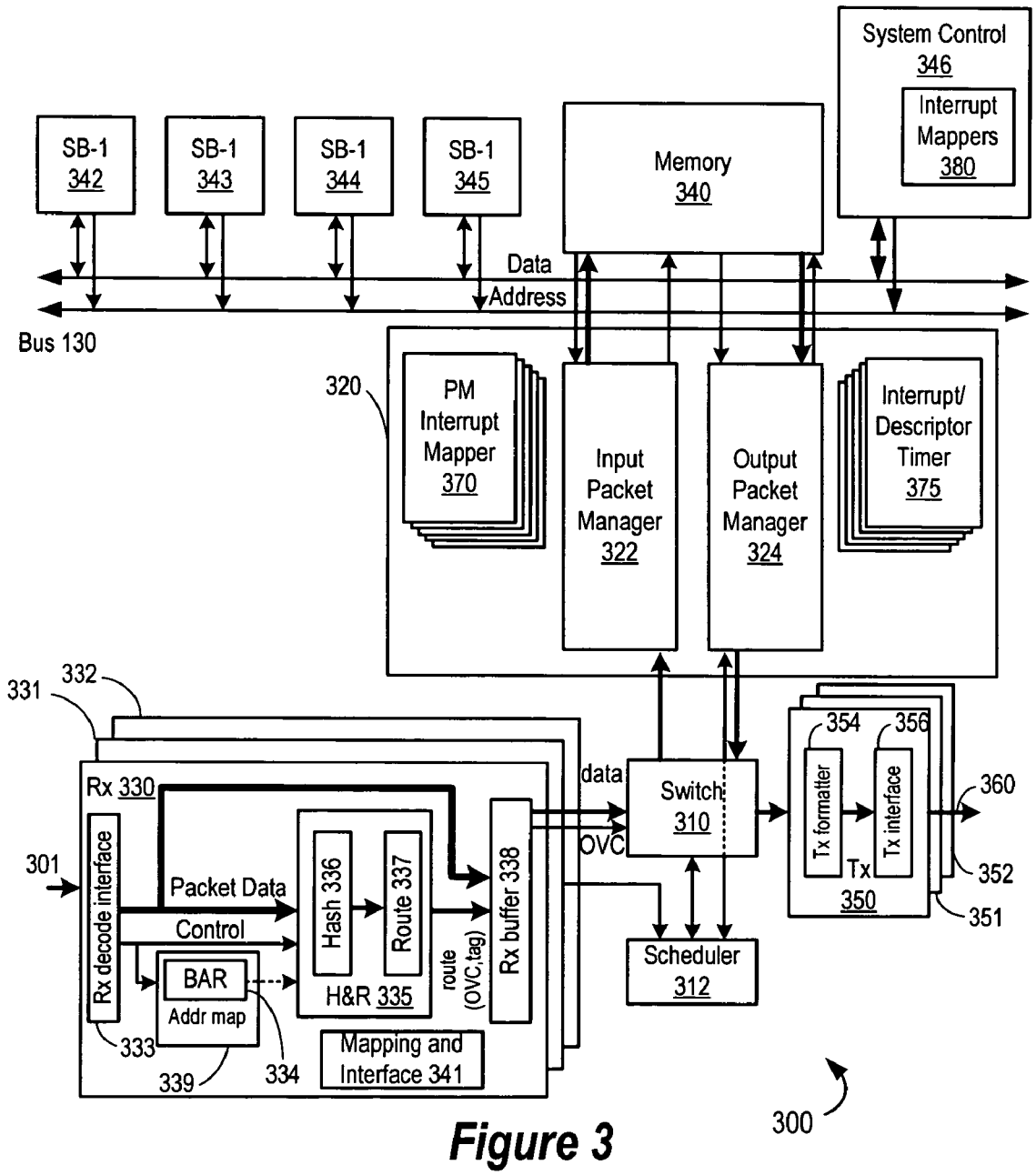
FIG. 3 depicts additional details concerning the packet processing functionality of a multiprocessor switching device embodiment of the present invention.

FIG. 3 depicts additional selected details concerning the receiver port and packet manager of the multiprocessor device of the present invention. In particular, each receiver circuit 330-332 includes a hash and route (H&R) circuit 335 in the illustrated embodiment, which maps packets from the IVCs to an output virtual channel (OVC). The OVC is used as the internal virtual channel for the system 300, and in particular is used to transmit packets through the switch 310 to the packet manager circuit 320 or to the transmitter circuits 350-352. Viewed in another way, requests to transmit packet data through the switch 310 are made based on the OVC of the packet, which identifies both the destination of the packet and the virtual channel at the destination. The OVC may also be referred to herein as a destination and the virtual channel at the destination. An example of how input virtual channels are routed by the H&R circuit via OVCs to various virtual channels for input queue and transmitter destinations is depicted in U.S. Patent Application Publication No. US 2003/0095559 A1, FIGS. 2-4 and the associated description of which was filed on Oct. 11, 2002, and is incorporated herein by reference in its entirety.

As depicted, the network and system chip 300 includes an on-chip five-port switch 310 that connects a node controller (shown in FIG. 1 as node controller 134) and packet manager 320 to three high-speed transmit/receiver circuits 330-332, 350-352. Software resident in the memory 340 and processors 342, 343, 344, 345 may process and modify incoming packets, may require direct storage in memory 340 without modification, and may generate packets for transmission via transmitter circuits 350-352. The node controller manages HyperTransport (HT) transactions and remote memory accesses for the cache coherent, distributed-shared-memory model of the system. The packet manager 320 provides hardware assisted packet processing capabilities, such as DMA engines, channel support, multiple input/output queues, TCP/IP checksum functions, and output scheduling. The high-speed receiver and transmitter circuits can operate in one of two modes; HT or SPI-4 Phase 2. The 16-bit HT mode allows connection to companion multiprocessor devices in a daisy-chain configuration, to HyperTransport bridge chips (e.g., 202, 204) for additional I/O devices (e.g., PCI-X peripherals 201, InfiniBand Fabric chips 203), or to an external switch for scalable bandwidth applications. The SPI-4 mode is intended for direct connection to physical layer network devices—e.g., 10 GE MAC, OC-192 SONET framer, or to an application specific (ASIC) chip that provides customer enabled network functions.

In the embodiment of FIG. 3, the receiver circuit 330 includes a decoder interface 333 (which includes an SPI decoder and an HT decoder including a PoHT BAR register 334), a hash and route (H&R) circuit 335, a receiver buffer 338 and additional interface and mapping circuitry 341 for interfacing with the switch 310 and scheduler 312. Other receiver circuits 331, 332 may be similar. The decoder 333 is coupled to receive input data on the port 301, and is coupled to provide an input virtual channel (IVC) and the packet data to the H&R circuit 335. The decoder 333 is also coupled to provide the packet data to the receiver buffer 338 for storage. The H&R circuit 335 is configured to generate an OVC and optionally a next destination (next_dest) value, which are received by the receiver buffer 338. The receiver buffer 338 is coupled to the switch 310 and scheduler 312. The H&R circuit 335 may also be coupled to a packet manager input map register 341.

The decoder 333 receives the input data from the port 301 and decodes the data according to the SPI specification (in the SPI decoder mode) or the HT specification (in the HT decoder mode). The decoding mode depends on which port 172, 174, 176 the receiver circuit 330 is coupled to, and may be selected in any desired fashion. The PoHT extension to the HT interface defines an address range (stored in the PoHT BAR register 334) to which HT sized-write commands may be directed in order to transmit packet data. The IVC may be carried in the sequence ID field of the HT packet, and selected bits of the address may indicate whether the data is the start of packet, middle of packet, or end of packet, the number of valid bytes in the last doubleword of the HT packet, and an error status. If an HT sized-write is decoded, and the address is in the address range indicated by the PoHT BAR register 334, the HT packet is a PoHT packet and the data transmitted with the sized write is packet data.

The decoder 333 provides the IVC of the packet and the received packet data to the H&R circuit 335. The H&R circuit 335 may select bytes of the packet data and/or the IVC and generate a corresponding OVC for use by the switch 310 in routing data on the chip 300. While the H&R circuit may implement any hashing and mapping function, in one embodiment the H&R circuit may support a number of programmable rules. Each rule selects bytes from the data (or the IVC) as the packet goes by and compares the selected data to an operand of the rule. Each rule may be evaluated on packet data and the true/false results of each comparison may be input to a path table. The path table includes entries which search for selected true or false results from the rules, and outputs path data from a matching entry. The path data may be an OVC, may be an index to a route table which outputs an OVC, or may select the output of a hash function or an extract function as the index to the route table (which may optionally be added to a base address which is also part of the path data). Additionally, for HT interfaces (such as an HT switch), a next_dest value may be output which is used to indicate to a transmitter circuit 350-352 on an HT interface, which base address to select from a table of base addresses for the write command comprising the PoHT packet. If the OVC indicates a virtual channel for the packet manager input 322, the H&R circuit 335 may use a packet manager input (PMI) map register 341 to map the virtual channel to an input queue of the packet manager input 322.

The path of a packet through the multiprocessor device 300 will now be described with reference to the network and system chip 300 depicted in FIG. 3. In this example, a packet comes into the chip through one of the receiver ports (e.g., 301), reaches software, is potentially modified, then sent to another chip through a transmit port 360.

Packet Reception

1. The packet 301 arrives through one of the three receiver interfaces 330-332 of the chip. The receiver interface (e.g., 330) can run in either SPI-4.P2 mode (native packet mode) or in HyperTransport (HT) mode, in which case, it uses a special extension called Packet-over-HyperTransport (POHT) to transfer the packets. From a logical perspective, both modes provide almost identical services. The receiver interface 330 deals with the specifics of the protocol and converts the control and data streams 301 into an internal packet format for the chip.

2. The packet control and data streams are sent to the hash and route (H&R) block 335, which includes a hash 336 and route 337 functionality. The purpose of the hash block 336 is to extract fields from the packet (specific parts of the headers usually) and hash them if necessary. The hash block 336 provides a small signature of the packet to a route table 337. Hashing is completely optional, can consist of the simple extraction of a byte from the packet, or can be any technique or algorithm that turns a variable-sized amount of text into a fixed-sized output (hash value).

3. The route block 337 takes parameters from the packet (such as the result of the hash and the input virtual channel the packet came in on) and looks up in a table to figure out where exactly the packet will go. Not only is the destination block determined (transmitters 350-352 or packet manager input (PMI) 322), but block-specific values like the virtual channel (for a transmitter) or the input queue (for the PMI) are also output from the route block 337.

4. While the packet is hashed and routed, it is also stored in the receiver buffer 338, which may be a large (e.g., 16 KB) buffer. The stored packet data will stay there until a routing decision has been made and it is scheduled to its destination block. The packet does not need to be entirely stored in the buffer 338 before being sent to its destination. For example, if the routing has been determined early, the first (e.g., 16 byte) chunk of data can be sent as soon as a threshold amount of bytes of the packet has been gathered.

5. As soon as a chunk of data from the packet is ready to go, the receiver interface (e.g., 330) sends a request to the switch scheduler 312. When the chunk can be scheduled, the scheduler 312 applies the required changes to the switch 310 and informs the receiver buffer 338 that it can start transmitting.

6. The receiver buffer 338 sends the chunk of data to the switch 310 and frees up the buffer space for more incoming packet data.

7. In this example, the routing table 337 has determined that the packet should be sent to the packet manager 320 to be processed by software. The input packet manager (PMI) portion 322 receives the packet data from the switch 310. A specific input queue (IQ) of the PMI 322 is chosen for the packet by the H&R module 335.

8. To know where to put the packet data, the PMI 322 reads one or more descriptors from main memory 340 (or from L1 or L2 caches or from a remote note). The descriptors contain the address and sizes of data buffers set aside by software to be used for incoming packets. They are also used as a synchronization mechanism between hardware and software.

9. As soon as the PMI 322 has a buffer to put the packet data into, it starts streaming the data to the memory 340 through the system bus. Once again, the final storage might be in a cache or in main memory.

10. When the PMI 322 is done with the packet, it writes back information about the packet in the descriptor(s) to tell the software that it is done with the packet and communicate some information about the packet (like its size).

11. The software typically waits (e.g., spins) on the descriptors in the various queues and as soon as one is marked ready by the PMI 322, it reads it. It can also be interrupted by the PMI 322 when a new packet arrives. It can also read the current pointer of the PMI 322 for a particular IQ.

12. The packet data is typically read, at least in part, by the software to figure out what to do with it. There is no particular constraint on which CPU 342, 344 deals with which IQ. There must just be some synchronization between the CPUs if IQs are shared.

Software Background Tasks

13. In the background, software finds free data buffers (typically recycled from packets just transmitted from an output queue (OQ)) and updates the descriptors in the IQs to provide the PMI 322 with storage for future packets. The software also updates a count field in the PMI 322 to tell it the number of new descriptors added.

14. As in the previous step, the software needs to reclaim output queue (OQ) descriptors that have been processed by the output packet manager (PMO) in order to free the data buffers and potentially use them for IQ descriptors.

Packet Transmit

15. When the software wants to send or forward a packet (e.g., from CPU 344), it needs to write it into a buffer in memory 340. Depending on the source of the packet data (higher-level software, fragments of input packets . . . ), the software might need to fully copy or create the packet data, modify it or leave it as is.

16. When the packet data is ready, the software will write one or more descriptors in the output queue (OQ) of the PMO 324 that has been chosen for the packet. The descriptor(s) contain essentially the address of the buffer where the packet fragments can be found and their size.

17. The PMO 324 waits for descriptors to be ready for transfer in the OQs. The software writes to a special register in the PMO 324 every time it adds new descriptors to be transmitted. Descriptors are read by the PMO 324 to extract the relevant information.

18. When the address where the packet resides at in memory 340 is known to the PMO 324, through the descriptor(s), the PMO 324 starts reading the address. The PMO 324 has a large output buffer equivalent to the receiver buffer 338, which is used to prefetch outstanding packet chunks, waiting for them to be scheduled for transmission.

19. PMO 324 writes the descriptor(s) back to memory 340 when the data associated with each descriptor is completely placed in the output buffer.

20. Each OQ in the PMO 324 sends all of its packets to the same internal destination (block, virtual channel). However, different OQ's can have different destinations. Accordingly, as soon as the PMO 324 has a full chunk of data available, it sends a request to the scheduler 312, much like the receiver interface does in step 5, to get the chunk scheduled to its destination. The scheduler 312 arbitrates between the many requests and when a chunk is scheduled, it changes the connections in the switch 310 and informs the source (the PMO 324 in this case) that it can transmit the chunk.

21. As soon as the PMO 324 gets a grant from the scheduler 312, the PMO 324 transmits the corresponding chunk of data to the switch 310. The PMO 324 can then free and reuse the allocated storage in the PMO buffer.

22. The switch 310 forwards the chunk of data to the final destination, such as a transmitter 350 in this example, as indicated by the scheduler 312.

23. Just like the receiver interfaces, the transmitters 350-352 can run in SPI-4 or HT mode. The transmitter formatter 354 will take the incoming packet data chunks from the switch and will format them according to the mode it is configured in. While the PMO 324 has enough storage to cover the round-trip latency to main memory, the transmitters 350-352 provide minimal buffering (4 KB) required to assemble outbound bursts of data on the high-speed links. In a selected embodiment, all data transmits through a 4 KB transmit buffer.

As will be appreciated, packets can go through the switch 310 without touching memory 340 and CPUs 342, 344 (skipping steps 7 to 21). Packets can also be sinked by software and not be forwarded (skipping steps 14 to 23) or sourced by software directly (skipping steps 1 to 13).

In a selected embodiment, each VC is independently flow-controlled so that if one VC is blocked, the other ones can still flow through. This way, there is no head-of-line (HOL) blocking due to the congestion of a flow. In addition, the flow of packets is controlled so that packets on the same VC travel one after the other, and fragments of different packets cannot be interleaved within the chip 300. By including start of packet (SOP) and end of packet (EOP) signaling in the control signal, the receivers can differentiate between the packets, even when packets of different VCs are interleaved on the input and output ports, depending on the unit of transfer on the underlying physical channel. In SPI-4 mode, each high-speed receive/transmit port (e.g., 162 in FIG. 2) supports multiple (e.g., 16) VCs with independent, calendar-based flow control. In HT mode, each high-speed receive/transmit port uses a special extension to the regular HT protocol called Packet-over-HyperTransport (PoHT) which emulates the functionality of the SPI-4 interface, providing multiple (e.g., 16) independent channels per port (in addition to the regular, non-packet HT and HTcc VCs).

The hash and route (H&R) block 335 makes all of the routing decisions for ingress packets from the high-speed receiver ports 330-332 by calculating, for each packet, an output virtual channel (OVC) which is used for internal switching on the multiprocessor device 300. The packets are then sent to either the packet manager input (PMI) 322 or to one of the transmit ports 350-352. The H&R module 335 is located in each of the three high-speed receiver ports 330-332. As a packet 301 enters the receiver port (e.g., 330), it is decoded and control information is extracted by the receiver interface or decoder 333. The H&R module 335 calculates the routing result by using this control information along with the packet data and several programmable tables in the H&R module 335. Routing information is encoded in the form of a switch or output virtual channel (OVC) which is used by the on-chip switch 310 to route packets. The OVC describes the destination module, such as the PMI 322 or transmitter ports 350-352, and either the input queue number (IQ) in the case of the PMI or the output channel in the case of the transmitter ports. When targeting the packet manager 320, the output virtual channel corresponds directly to IQs. On the output side, the packet manager 320 maps an OQ into one OVC which always corresponds to a transmitter port. In addition, multiple sources can send packets to a single destination through the switch. If packets from different sources (receivers 330, 331, 332 or PMO 324) are targeted at the same output VC of a transmitter port or the IQ of the PMI 322, the switch 310 will not interleave chunks of packets of different sources in the same VC. Both the packet data and its associated route result are stored in the receiver buffer 338 before the packet is switched to its destination. The H&R module 335 can be implemented by the structures disclosed in copending U.S. patent application entitled "Hash and Route Hardware With Parallel Routing Scheme" by L. Moll, Ser. No. 10/684,871, filed Oct. 14, 2003, and assigned to Broadcom Corporation, which is also the assignee of the present application, and is hereby incorporated by reference in its entirety.

Figure 4:
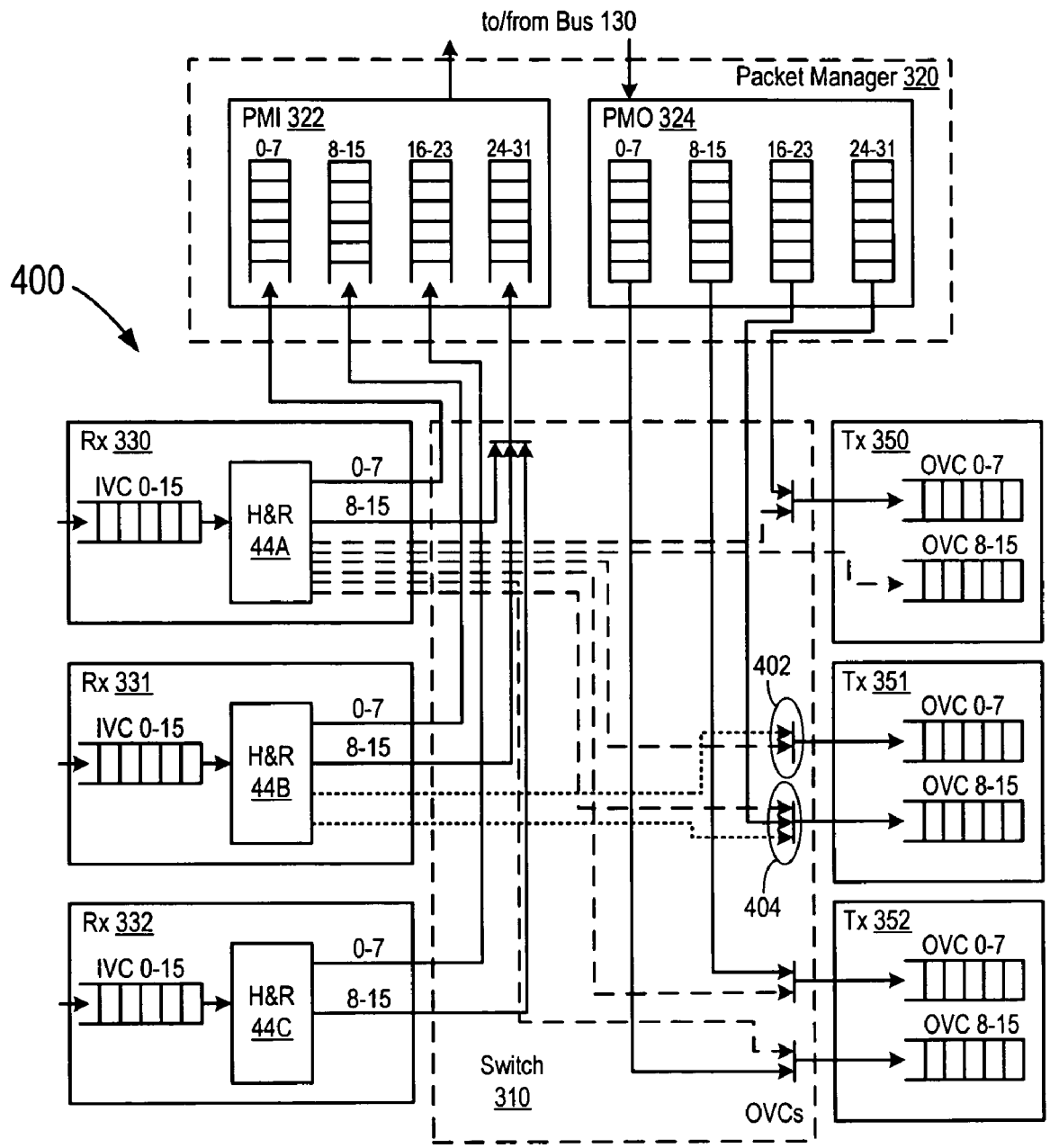
FIG. 4 is a block diagram illustrating one embodiment of virtual channels in the system of FIG. 1.

Turning now to FIG. 4, a block diagram illustrating one embodiment of virtual channels in the system 300 is shown, as well as examples of splitting and merging packet traffic. In the illustrated embodiment, the receive interface circuits 330-332 and the transmit circuits 350-352 are shown. Additionally, the packet manager circuit 320 is shown as including an input packet manager circuit (PMI) 322 and an output packet manager circuit (PMO) 324. The PMI 322 is coupled to transmit write commands on the bus 130 to write received packets to memory. The PMO 324 is coupled to transmit read commands on the bus 130 and to receive the read data comprising packets to be transmitted from the system 300. Additionally, as mentioned above, each of the PMI 322 and the PMO 324 may be configured to read and write descriptors defining the locations in memory to which the packets are to be read and written. Each of these events and others may cause interrupts to be issued by the packet manager 320 which are mapped to a predetermined or dedicated processor for handling.

Each receive circuit 330-332 supports a set of input virtual channels (IVCs) defined by the interface from which the receive circuit receives packet data. For example, the SPI-4 interface and the HT interface may both support 16 virtual channels in hardware (although more may be used by software in the SPI-4 interface, since an 8-bit virtual channel value is supported). Thus, each receive circuit 330-332 supports 16 IVCs (numbered 0-15 in FIG. 4). Similarly, each transmit circuit 350-352 supports 16 output virtual channels (OVCs), numbered 0-15 in FIG. 4. Other embodiments may employ more or fewer IVCs and OVCs according to the interfaces supported by those embodiments.

The PMI 322 includes a logical set of input queues (e.g. 32 in the illustrated embodiment, numbered 0-31, although more or fewer input queues may be included in other embodiments). The PMO 324 includes a logical set of output queues (e.g. 32 in the illustrated embodiment, numbered 0-31, although more or fewer output queues may be included in other embodiments). In the packet manager, each queue has its own interrupts that require mapping to a specified processor.

Each receive circuit 330-332 includes a hash and route (H&R) circuit 44A-44C in the illustrated embodiment, which maps packets from the IVCs to an output virtual channel (OVC). The OVC is used as the internal virtual channel for the system 400, and in particular is used to transmit packets through the switch 310 to the packet manager circuit 320 or to the transmit circuits 350-352. Viewed in another way, requests to transmit packet data through the switch 310 are made based on the OVC of the packet, which identifies both the destination of the packet and the virtual channel at the destination. The OVC may also be referred to herein as a destination and the virtual channel at the destination.

In the illustrated embodiment, the H&R circuits 44A-44C may map the IVCs to one of 16 PMI VCs (numbered 0-15 in FIG. 4, using solid lines from the H&R circuits 44A-44C). These PMI VCs may be further mapped to input queues in the PMI 322, e.g., using a register to which the H&R circuit 44A is coupled. That is, VCs at the PMI 322 may correspond directly to input queues. In the illustrated embodiment, PMI VCs are mapped to input queues in blocks of eight (e.g., PMI VC 0-7 is mapped to input queue 0-7, or input queue 8-15, or input queue 16-23, or input queue 24-31 in a one-to-one fashion). In other embodiments, each PMI VC may be individually mappable to an input queue, or other sized blocks of input queues may be mappable to PMI VCs. In yet another embodiment, the H&R circuits 44A-44C may directly map IVCs to PMI input queues (e.g., without the intermediate step of PMI VCs). Additionally, the H&R circuits 44A-44C may map packets from an IVC to an OVC in one of the transmit circuits 350-352, illustrated for H&R circuit 44A with dashed lines through the OVCs block to the transmit circuits 350-352.

The H&R circuits 44A-44C may be used to split packets from the same IVC to different OVCs (e.g., different input queues in the PMI and/or OVCs in the transmit circuits 350-352). Thus, the H&R circuits 44A-44C may provide software flexibility to separate packets for processing versus packets to be passed through the transmit circuits 350-352 based on various packet attributes (such as header values), or may provide for separating packets into different input queues in the PMI 322 (e.g., for different types of processing) based on various packet attributes. The H&R circuits 44A-44C may also be programmed to map IVCs to OVCs without using any additional packet attributes, or a combination of such mappings and other mappings using additional packet attributes, as desired. In other embodiments, the receive circuits 330-332 may not include H&R circuits and may instead use a programmable or fixed mapping of each IVC to a specified OVC (transmit circuit 350-352 and OVC in that circuit or PMI 322 and an input queue in the PMI 322). It is noted that packets which are routed from a receive circuit 330-332 directly to a transmit circuit 350-352 bypass the packet manager circuit 320, the system memory, and processing by the processors.

The PMO 324 output queues are also mapped to various transmit circuits 350-352 and to OVCs in those transmit circuits 350-352. In the illustrated embodiment, output queues are mapped to transmit circuits and OVCs in blocks of 8, similar to the mapping of IVCs to input queues. Other embodiments may map output queues individually, or in other-sized blocks, as desired. In one embodiment, the PMO 324 includes a configuration register or registers programmed with the mapping of each block of 8 output queues to a corresponding group of OVCs (which identify the transmit circuit 350-352 and the OVC within that transmit circuit). Other embodiments may use more elaborate mapping mechanisms similar to H&R circuits, to map packets based on packet attributes in addition to output queues, if desired.

FIG. 4 illustrates, via the solid arrows between the H&R circuits 44A-44C and the PMI 322, an exemplary mapping from the PMI VCs of the H&R circuits 44A-44C to the input queues of the PMI 322. The exemplary mapping is but one example of the mappings that may be used, as programmed into the receive circuits 330-332 by software. In the example, PMI VCs 0-7 from the H&R circuit 44A are mapped to input queues 0-7; PMI VCs 0-7 from the H&R circuit 44B are mapped to input queues 8-15; PMI VCs 0-7 from the H&R circuit 44C are mapped to input queues 16-23; and PMI VCs 8-15 from each of the H&R circuits 44A-44C are merged to input queues 24-31. When mappings merge the PMI VCs from different H&R circuits 44A-44C, the switch 310 may perform the merging on packet boundaries. That is, when a given receive circuit 330-332 has been granted permission to transfer a packet to an input queue that is merged among the receive circuits 330-332, the switch inhibits granting any other receive circuit 330-332 on that input queue until the granted receive circuit 330-332 reaches a packet boundary. Any combination of PMI VCs from different receiver circuits 330-332 may be merged into input queues, as desired in various mappings.

FIG. 4 also illustrates, via the solid arrows between the PMO 324 and the transmit circuits 350-352, an exemplary mapping of output queues to transmit circuits and OVCs. The exemplary mapping is but one example of mappings that may be used, as programmed by software. In the illustrated mapping, output queues 0-7 are mapped to OVCs 8-15 in the transmit circuit 352; output queues 8-15 are mapped to OVCs 0-7 in the transmit circuit 352; output queues 16-23 are mapped to OVCs 8-15 in the transmit circuit 351; and output queues 24-31 are mapped to OVCs 0-7 in the transmit circuit 350. Additionally, receive circuits 330-332 may map IVCs to OVCs, and thus there may be merging of packets from receive circuits 330-332 and output queues to an OVC. Again, the switch 310 may handle this merging on packet boundaries.

As mentioned above, there may be mappings of IVCs in receive circuits 330-332 to OVCs in the transmit circuits 350-352. In FIG. 4, for example, dashed lines illustrate possible mappings from the receive circuit 330 IVCs (via the H&R circuit 44A) to the OVCs of the transmit circuits 350-352. Additionally, dotted lines from the receive circuit 331 (the H&R circuit 44B) to the transmit circuit 351 OVCs illustrate two possible mergings of packet streams, one indicated at 402 where the packet stream from receiver 331 merges with a packet stream from receiver 330 into OVC 0-7 in transmitter circuit 351, and the other indicated at 404 where the packet stream from receiver 331 merges with a packet stream from receiver 330 and a packet from PMO channels 16-23 into OVC 8-15 in transmitter circuit 351. Again, the switch 518 may merge packets from different receive circuits 330-332 to a given OVC on a packet boundary basis. Merging may occur between any combination of receive circuits 330-332 and the PMO 324.

The input queues of the PMI 322 and the output queues of the PMO 324 may be logical queues. That is, the queues may actually be implemented in system memory. The PMI 322 and the PMO 324 may include buffers to buffer the packet data being transmitted to and from the system memory. The queues may be implemented in any fashion. In one particular embodiment, each queue is implemented as a descriptor ring (or chain) which identifies memory buffers to store packet data corresponding to a given input queue. Additional details concerning the use of descriptors to control packet memory transfer operations are disclosed in copending U.S. patent applications entitled "Descriptor Write Back Delay Mechanism to Improve Performance" by K. Oner, Ser. No. 10/685,137, filed Oct. 14, 2003, "Exponential Channelized Timer" by K. Oner, Ser. No. 10/684,916, filed Oct. 14 ,2003, and "Descriptor-Based Load Balancing" by K. Oner and J. Dion, Ser. No. 10/684,614, filed Oct. 14, 2003, now U.S. Pat. No. 6,981,074, issued Dec. 27, 2005, each of which is assigned to Broadcom Corporation, which is also the assignee of the present application, and each of which is hereby incorporated by reference in its entirety. In other embodiments, the queues may be implemented in any desired fashion (e.g., linked lists, contiguous memory locations for the packet memory buffers, etc.). The PMI 322 and the PMO 324 may generate read and write commands to fetch and update descriptors.

It is noted that, while the receive circuits 330-332 and the transmit circuits 350-352 are described as supporting various virtual channels for packets, in some embodiments these circuits may support additional virtual channels for other types of traffic. For example, the HT interface is capable of carrying non-packet traffic (e.g., I/O traffic) in additional virtual channels. Additionally, in one embodiment, the HT interface may support coherent virtual channels (that is, virtual channels that carry coherent traffic) for transactions used to maintain coherency among devices on the HT interface. The receive circuits 330-332 and the transmit circuits 350-352 may be designed to additionally route data received on these VCs according to the HT definition and/or coherency requirements.

Figure 5:
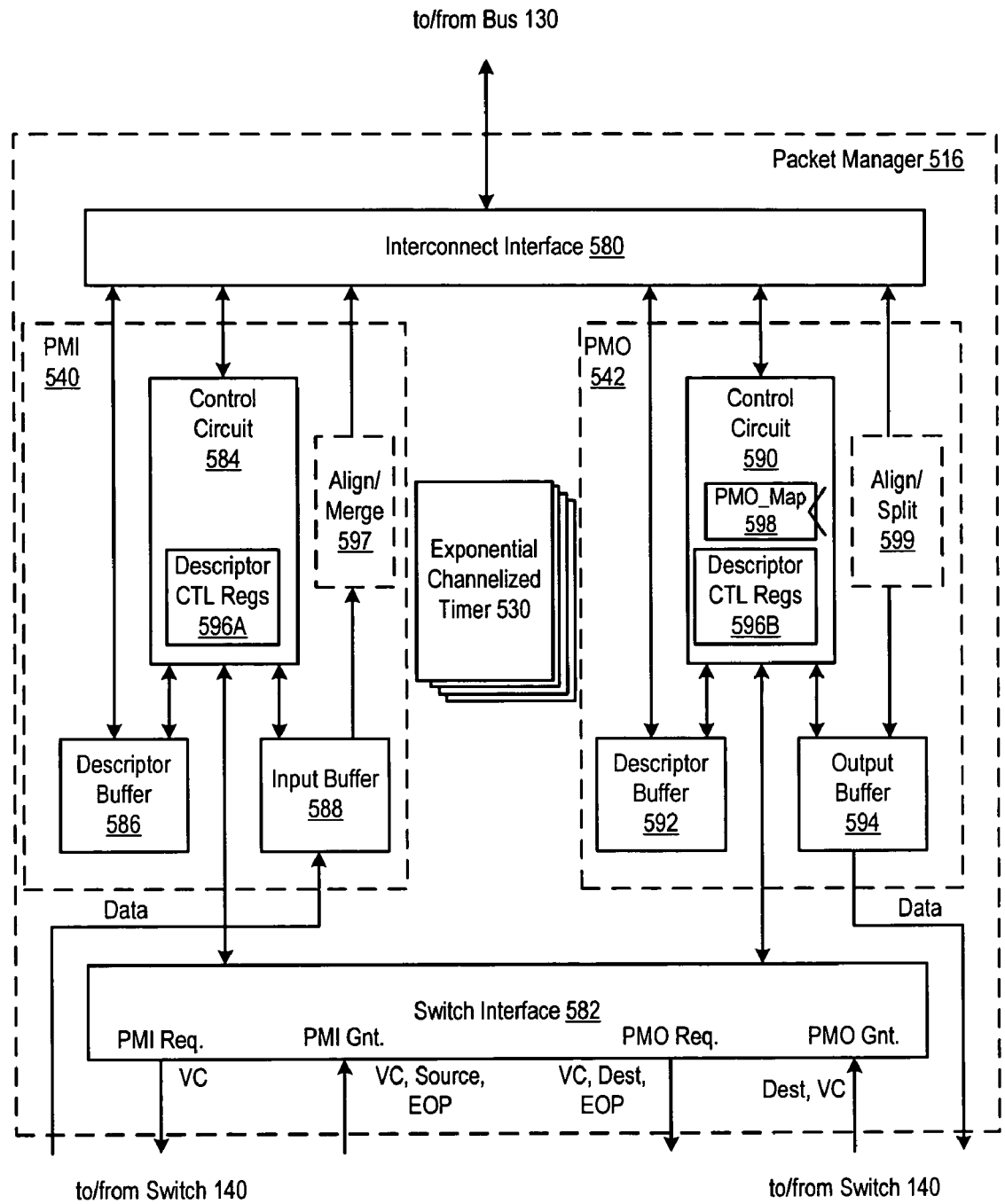
FIG. 5 is a block diagram of one embodiment of a packet manager circuit.

Turning now to FIG. 5, a block diagram of one embodiment of the packet manager circuit 516 is shown in greater detail. In the embodiment of FIG. 5, the packet manager circuit 516 includes an interconnect interface circuit 580 for communicating on the bus 130, the PMI 540, the PMO 542, and a switch interface circuit 582. The PMI 540 includes a control circuit 584, a descriptor buffer 586, and an input buffer 588. The PMO 542 includes a control circuit 590, a descriptor buffer 592, and an output buffer 594. The control circuit 584 includes a set of descriptor control registers 596A, and the control circuit 590 similarly includes a set of descriptor control registers 596B. Additionally, the control circuit 590 includes a PMO Map register 598. The interconnect interface 580 is coupled to the bus 130, the descriptor buffers 586 and 592, the control circuits 584 and 590, the input buffer 588, and the output buffer 594. The control circuit 584 is further coupled to the descriptor buffer 586, the input buffer 588, and the switch interface circuit 582. The input buffer 588 is coupled to receive data from the switch 140. The control circuit 590 is further coupled to the descriptor buffer 592, the output buffer 594, and the switch interface circuit 582. The output buffer 594 is coupled to provide data to the switch 140. The switch interface circuit 582 is coupled to request and grant interfaces to the switch 140 for the PMI 540 and the PMO 542.

The control circuit 584 controls the transfer of packets from the receive interface circuits to the system memory. As mentioned above, the PMI 540 includes a logical set of input queues to which packets may be transferred. Each input queue is implemented, in the present embodiment, via a descriptor ring in memory. The descriptor ring comprises a set of descriptors, each of which identifies a memory buffer in memory that may be used to store packet data for the corresponding input queue. One or more descriptors may be occupied by a given packet. An exemplary descriptor ring for one embodiment is described in more detail below.

The control circuit 584 may prefetch one or more descriptors (the next descriptors in the ring that are to receive packet data) into the descriptor buffer 586. In one embodiment, for example, up to 8 descriptors may be prefetched for each input queue. If at least one descriptor is available to receive packet data in a given input queue, the control circuit 584 may signal the switch interface 582 to request a packet on that input queue. In one embodiment, two descriptors may comprise a cache block. If the software is issuing two or more descriptors at a time, a prefetch of both descriptors may be generated as a combined command to reduce the traffic on the interconnect interface 580.

The switch interface circuit 582 may request a packet for an input queue using the PMI request interface. The PMI request interface indicates which input queue (which VC) the PMI has space to store data in. The PMI request interface may also include a valid indication indicating whether or not a request is being made. The PMI request interface may be similar to other destination request interfaces (e.g., those used by the transmit interface circuits). The switch 140 may grant to a source and destination once both the source and the destination have requested a transfer on the same destination VC. The PMI grant interface indicates which source is transferring data, on which VC (which input queue) and whether or not the transfer is the end of the packet (EOP). The switch interface circuit 582 may signal the control circuit 584 when a grant has been received, and the control circuit 584 may cause the corresponding data to be stored in the input buffer 588. The input buffer 588 may include storage for each input queue, to temporarily store packet data until a write command is generated to write the packet data to the memory buffer selected for the packet. In some embodiments, the input buffer 588 may be configured to store less than a full packet for a given input queue.

Generally, the control circuit 584 may generate read commands to the interconnect interface circuit 580 to prefetch descriptors into the descriptor buffer 586. Additionally, the control circuit 584 may generate write commands to the interconnect interface circuit 580 to write data from the input buffer 588 to the memory buffer, and to write the descriptor back to memory after the descriptor has been used to store packet data. The interconnect interface circuit 580 may transmit the commands on the bus 130 and, in the case of reads, return data to the descriptor buffer 586. In one embodiment, the bus 130 may perform cache block sized transfers (where a cache block is the size of a cache line in caches within the system 100, e.g. 32 bytes in one embodiment). In such embodiments, if a write command does not write the entire cache block, the interconnect interface circuit 580 may perform a read-modify-write operation to perform the write. As will be appreciated, a read-modify-write operation requires a delay while the cache line being written to is retrieved or read from memory over the system bus 130 so that it can be merged with (or written over in part by) the new data for the cache line. In one embodiment, descriptors may occupy one half of a cache block. In such embodiments, the packet manager circuit 516 may attempt to delay the write back of the first descriptor of a cache block to allow the second descriptor to also be written together (thus avoiding a higher latency read-modify-write operation). The delay may be fixed or programmable, and the first descriptor may be written using a read-modify-write operation if the delay expires without a write of the second descriptor. The second descriptor may subsequently be written using a read-modify-write operation as well. Because the system can not wait indefinitely for additional descriptors to be released, a programmable timer 530 (or 375 in FIG. 3) is provided for controlling the delay. In selected embodiments, multiple timers 375 may be provided, such as a timer for descriptor write back operations and a timer for the interrupt operations. This can be replicated in both the PMI 540 and the PMO 542.

The control circuit 590 controls the transfer of packets from memory to the transmit interface circuits. As mentioned above, the PMO 542 includes a logical set of output queues from which packets may be transferred. Each output queue is implemented, in the present embodiment, via a descriptor ring in memory, similar to the input queues.

The control circuit 590 may prefetch one or more descriptors (the next descriptors in the ring from which packet data is to be transmitted) into the descriptor buffer 592. In one embodiment, for example, up to 8 descriptors may be prefetched for each output queue. If at least one descriptor has packet data in a given output queue, the control circuit 590 may also prefetch the packet data into the output buffer 594. Once at least a switch transfer's worth of packet data has been read into the output buffer 594 for a given output queue, the control circuit 590 may signal the switch interface circuit 582 to request a transfer to the destination for that packet (one of the transmit interface circuits) for that output queue. In one embodiment, output queues are mapped to OVCs in the transmit interface circuits in groups of 8, as described above with respect to FIG. 4. The PMO_map register 598 may store the mappings, and thus the control circuit 590 may determine which destination and which OVC at that destination to request based on the mappings.

The switch interface circuit 582 may request a destination for an output queue using the PMO request interface. The PMO request interface may be similar to the request interface from the receiver interface circuits, and generally indicates which destination (which transmit interface circuit) and which VC (OVC) on the transmit interface circuit that the PMO has packet data to transmit. In other words, the PMO request interface generally indicates the OVC that the PMO has packet data to transmit on. Additionally, if the requested transmission will include the end of the packet, the PMO request interface indicates such with the EOP indication. The PMO request interface may also include a valid indication indicating whether or not a request is being made, packet error status, etc. The PMO grant interface, again similar to the receive grant interface, indicates which destination and VC is granted (e.g., which OVC is granted). The switch interface circuit 582 may signal the control circuit 590 when a grant has been received, and the control circuit 590 may cause the corresponding data to be read out of the output buffer 594 to the switch 140 (and ultimately to the destination transmit interface circuit).

Generally, the control circuit 590 may generate read commands to the interconnect interface circuit 580 to prefetch descriptors into the descriptor buffer 592 and to prefetch packet data into the output buffer 594. Additionally, the control circuit 590 may generate write commands to the interconnect interface circuit 580 to write the descriptor back to memory after the packet data from that descriptor has been read into the output buffer 594. The interconnect interface circuit 580 may transmit the commands on the interface and, in the case of reads, return data to the descriptor buffer 590 and the output buffer 594.

As mentioned above, the interconnect interface circuit 580 may include the circuitry for communicating on the bus 130. Additionally, in some embodiments, the interconnect interface circuit 580 may include buffers to store read and write commands until they can be transmitted on the bus. Again, the programmable timer 530 may be used to generate timer request signals for each channel to be used in controlling the timing of system operations, such as descriptor write back interrupt issuance upon completion of a packet transfer.

In some embodiments, the PMI 540 may include an align/merge circuit 597 coupled between the input buffer 588 and the interconnect interface 580. In one embodiment, the offset for a memory buffer for the packet data need not be aligned to a cache block boundary in the system memory. The align/merge circuit 597 may align the packet data from the input buffer 588 to the offset specified in the descriptor.

Additionally, the align/merge circuit 597 may merge switch transfers of data to fill a cache block, if the switch transfer width is less than a cache block in size. Similarly, the PMO 542 may include an align/merge/split circuit 599 coupled between the interconnect interface 580 and the output buffer 594. The align/merge/split circuit 599 may drop leading bytes from a cache block that are not part of a packet, and may merge data from multiple commands on the bus 130 to create a switch transfer's worth of data (e.g. 16 bytes, in one embodiment).

Figure 6:
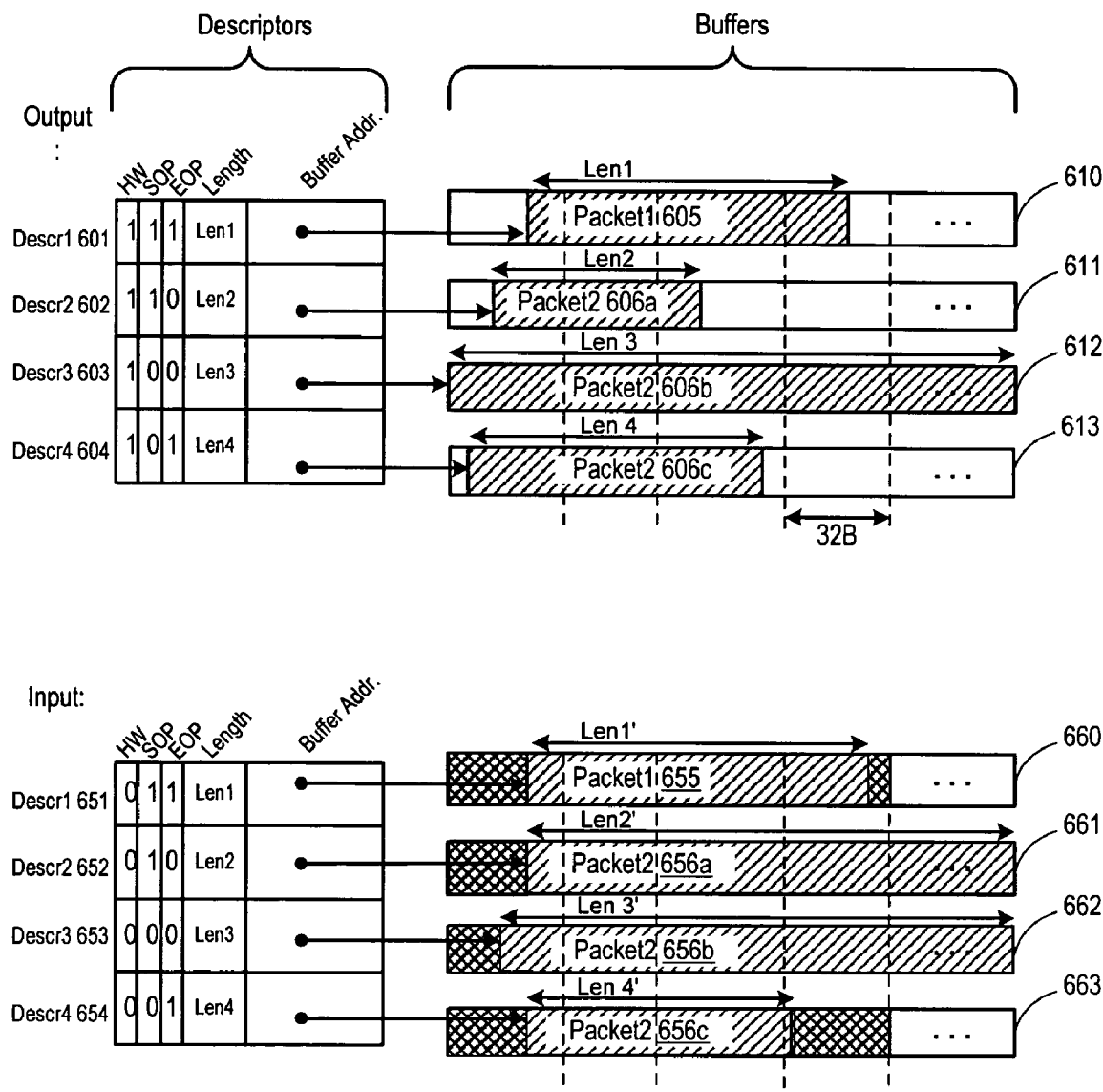
FIG. 6 illustrates how input and output packets are stored and retrieved in memory with reference to descriptor pointers.

Turning now to FIG. 6, the transfer of two packets (Packet1 and Packet2) to and from system memory using single and multiple descriptors is illustrated for both the PMI 322 and PMO 324. As depicted, descriptors 601-604 represent an output queue 610-613 ready for transmission, as indicated by the hardware bits (HW) being set to "1." Descriptors 651-654 represent an input queue 660-663 that the packet manager 320 has just written to memory (e.g., memory 340 or cache memory 118), as indicated by the hardware bits (HW) being set to "0." For both input and output packets, the first packet (e.g., first output packet 605) is small enough to fit in a single descriptor (e.g., 601). With such packets, the output descriptor (Descr1 601) has the EOP and the SOP bits set. Likewise, the input descriptor (e.g., Descr1 651) has both its SOP and BOP bits set. In the input queue, the length field (Len1) of the first descriptor (Descr1 651) is updated with the correct packet length (Len1') after the packet is received by packet manager 320.

As illustrated, the long packet (Packet2) spans multiple descriptors. For example, in the input queue, the long packet 656 spans three descriptors 652, 653, 654. The first descriptor (Desc2) 652 for this packet points to the start of the packet (Packet2) with its buffer address field, and in addition, its SOP bit is set. In the output queue, the SOP bit of descriptor 602 is set. As a packet is being received, the length field of the descriptor (e.g., Desc2 652) will be used by the packet manager to determine how much more space is left in the buffer 661. When the buffer 661 is filled, the next descriptor 653 is used to continue to fill the packet, and this is repeated with the remaining descriptors 653, 654. The total length of Packet2 656 is determined by the software by adding up the length fields (Len2', Len3', Len4') of each descriptor (Descr2, Descr3, and Descr4).

In connection with the present invention, it is also significant to note that the long packet 656 (Packet2) is well over 32 B in length, which requires that multiple 16 B chunks of data received from the switch 140 be combined or merged as part of buffer storage 660-663 through the PMI.

In operation, once a descriptor is prefetched by the PMI 322, packet reception begins when the top descriptor (e.g., Desc1 651) is fetched from the prefetch descriptor buffer 586. The PMI 322 uses the start buffer address in the descriptor (e.g., Desc1 651) to determine where to write the received data in the memory. The length field is used to determine how much data to write into a specific buffer (e.g., 660). The PMI 322 writes into the buffer until either the end of the packet is observed or the buffer is full. If one of these conditions occurs, the descriptor is updated and written back. For example, if this was the start of the packet, the PMI 322 writes a "1" to the SOP bit of the descriptor. If this was the end of the packet, the PMI 322 writes a "1" to the EOP bit of the descriptor. The length field is then overwritten with the actual length (Len1') of buffer used. The PMI 322 then writes a zero to the hardware bit to change ownership of the descriptor to software.

Figure 7:
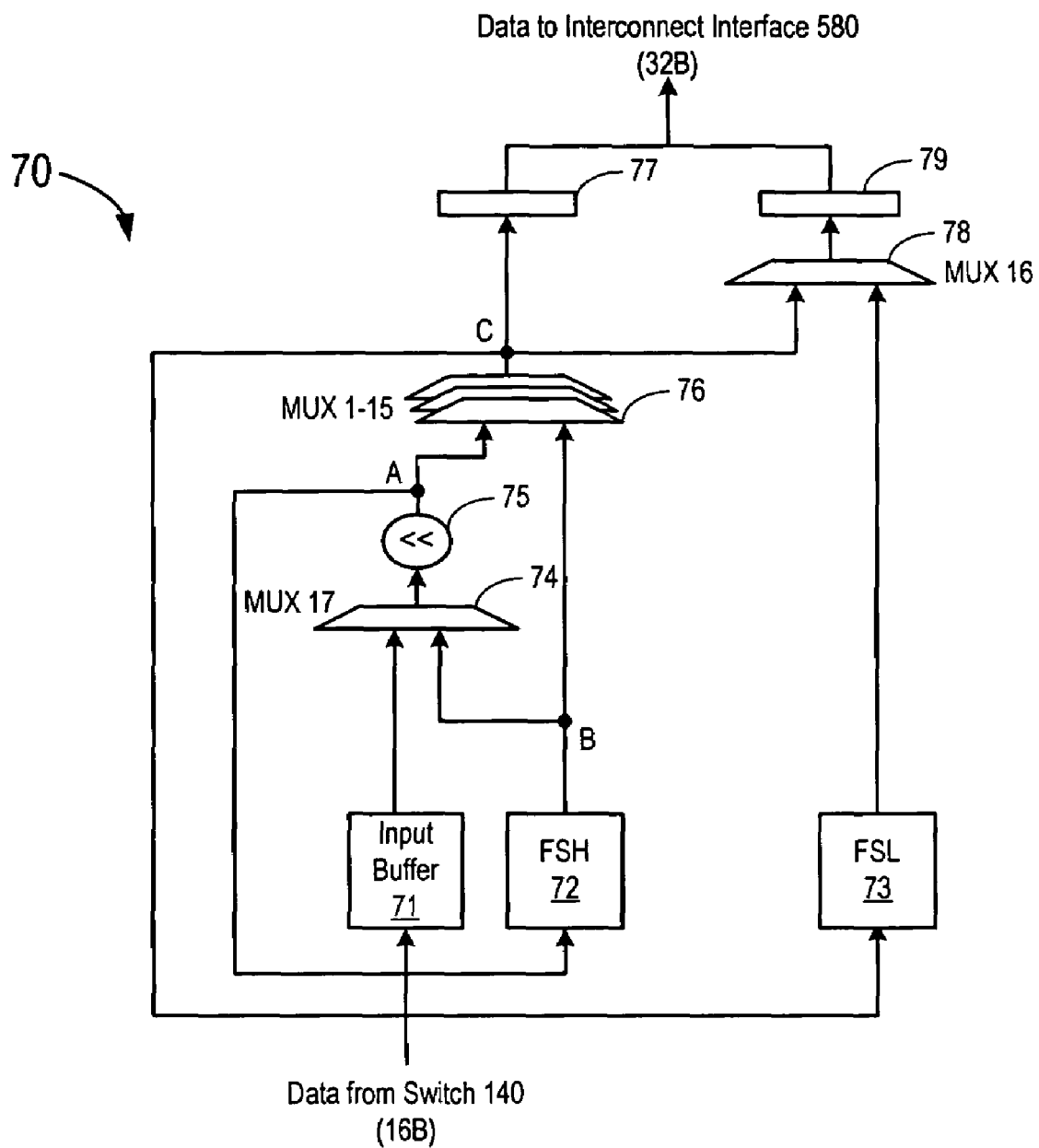
FIG. 7 is a block diagram of the datapath for PMI alignment and merge circuit in accordance with an embodiment of the present invention.

As illustrated in FIG. 7, packet fragments may be stored at any starting address having any offset or a fixed offset from cache alignment, as specified by the descriptors. To the extent that an incoming packet fragment for a packet (e.g., Packet1) is received and stored in an input buffer 71 (e.g., from 16 KB receiver buffer or 512 B/channel buffer) that has a smaller width than the output buffer width (e.g., buffers 77, 79) for the shifted packet fragment, the smaller data portions or fragments from a packet must be aligned in accordance with the offset requirements imposed by the descriptor and/or must be aligned with the previous data fragment for merger into the memory buffer(s) for that packet. The present invention may also be used to translate larger input buffers to smaller output buffers.

In situations where the width of the memory bus 130 differs from the width of other circuits that transfer data to the memory (such as the I/O interface in the switch 140 or receiver interface circuit 330), the present invention provides a system and method for efficiently transferring data transfers by aligning and merging data blocks during memory read and write operations. In addition, the retrieval of data from memory may also use the data splitting and alignment techniques of the present invention to break apart larger blocks of data from memory for transfer on the transmitter circuit (e.g., 350).

For example, where an I/O interface bus width is 16 B (such as provided from the switch 140 to the PMI 540) and the memory bus is 32 B wide (such as provided at interconnect interface 580), improved memory transfer performance is obtained by merging incoming data blocks data for data transfers from the switch 140 to the memory interface 580. In the example described herein, at least two 16 B blocks of data from the switch 140 must be received and merged together before an entire 32 B wide memory line can be written to the memory interface 580. Such merging of data blocks to fill a memory line is particularly useful when data is transferred using write-invalidate commands. In certain software applications, received data blocks must also be aligned for writing to memory, such as when a specific offset for the starting address of a packet buffer is specified by a descriptor. With respect to the example described herein, if the offset is less than 16 B, the first 16 B of data received from the switch is stored in an input buffer and shift rotated so that the least significant bits of the first 16 B of data are aligned with an offset and stored in a first fragment store buffer (e.g., FSL 73). Any portion of the shifted first 16 B of data that does not fit in the first buffer is stored in a second fragment store buffer (e.g., FSH 72) where it is combined with data from the second 16 B of data received from the switch. When aligned and merged data contains a full 32 B of data, it is transferred to the interconnect interface for transmission to a 32 B memory line.

On the transmit side, the reverse is true. In particular, one 32 B data from memory 340 must be converted into two 16 B data beats in order to send it over a smaller bus width (such as an I/O interface 582) for transmission by the transmit circuit (e.g., 350). Moreover, if outgoing data needs to be aligned, then up to two 32 B data reads may be needed to create one or two 16 B data writes to the I/O interface 582. The present invention also provides for multiple alignment operations on successive memory read operations on memory buffers that are not aligned with one another, such as where data buffers are represented by outgoing data descriptors that point to buffers that can have any alignment in the memory 340. Moreover, when output descriptors being processed by the PMO 542 point to small buffers (e.g., as small as 1 B), multiple buffers need to be collected and merged before sufficient data (e.g., 16 B) can be written to the I/O interface 582.

Turning now to FIG. 7, the data path for the packet manager input circuit 540 is illustrated with the PMI alignment and merge circuit 70, whereby data from the switch 140 is transmitted via the packet manager to the system bus 130. As depicted, data received from the switch 140 is stored in an input FIFO buffer 71. Input buffer 71 is used as a skid buffer between switch 140 and the PMI 540. In a selected embodiment, the buffer 71 is divided into multiple regions, where each region is used to store incoming data for a channel that is being stored into the memory 340. Each channel's region of the buffer is used to implement a FIFO buffer for that channel.

Figure 8:
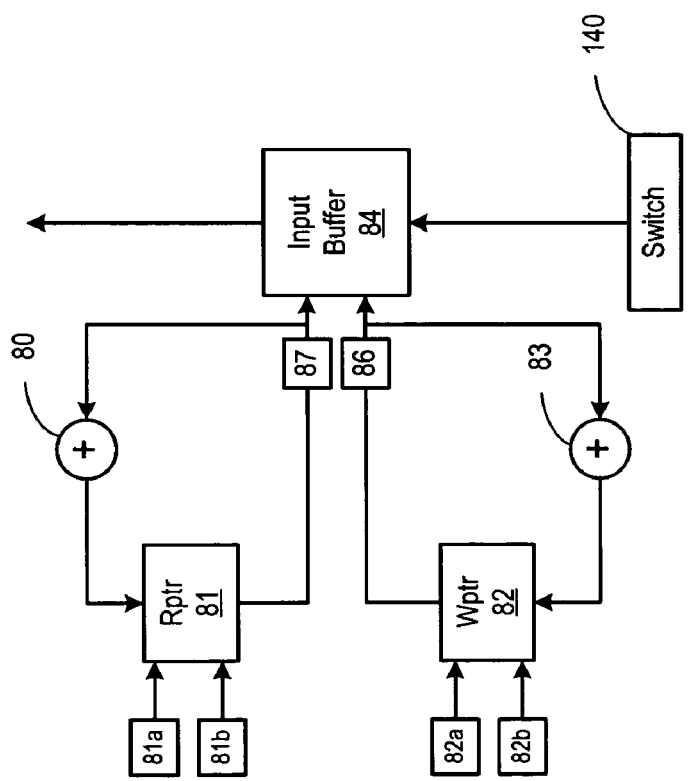
FIG. 8 depicts an embodiment of an input buffer that may be used in the present invention for aligning or merging data.

FIG. 8 illustrates a selected embodiment where the input FIFO buffer 71 for a channel is implemented with a read pointer 81 and a write pointer 82, each of which has a write address 81a, 82a and a read address 81b, 82b. These pointers are used to point to the entry at the head and at the tail of the FIFO 84, respectively, for a given channel. When there are multiple channels 86, pointers for each channel's buffer may be incremented 80, 83 and stored in a one read register file 87 or a write register file.

Figure 10:
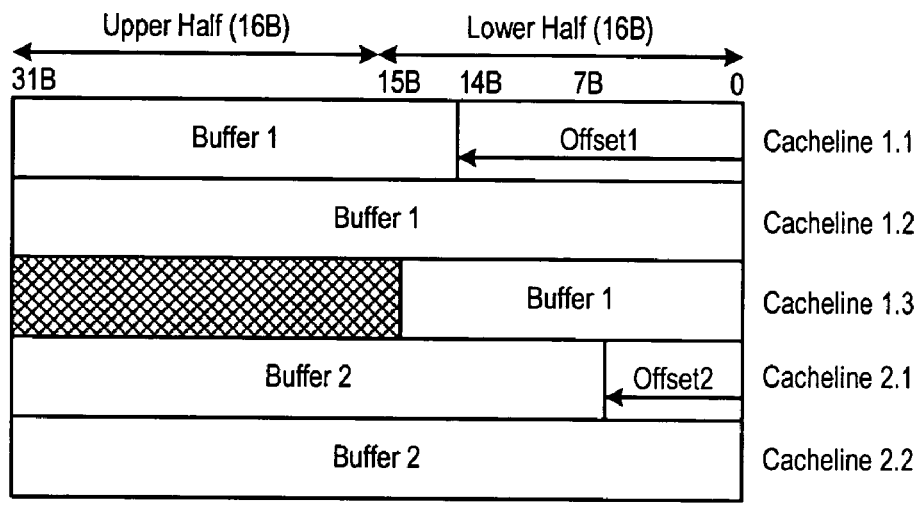
FIG. 10 illustrates an example of the memory mapping of two buffers during PMI packet reception.

Referring back to FIG. 7, data that is sent to the interconnect interface 580 may be aligned for storage in the memory based on information in the descriptor. For example, an offset for a particular memory line may define a starting address of a buffer in memory 340 where the data needs to be stored by the PMI 540. When the starting address of a buffer pointed to by a descriptor can have any byte offset in the memory 340, the final location in memory 340 of the data received from the switch 140 may not be cache line aligned. For example, FIG. 10 illustrates the memory mapping of two buffers (Buffer 1 and Buffer 2) in memory. Buffer 1 is to be stored in cacheline 1.1, beginning at a 14 B offset (Offset 1) from byte position 0 and proceeding through the remainder of cacheline 1.1, cacheline 1.2 and the lower half of cacheline 1.3. As a result, the starting placement of data received from the switch 140 must be shifted by the PMI alignment and merge circuit 70 so that it is offset 14 B into the lower half of cacheline 1.1. In a selected embodiment, software may be used to control the placement of the buffer so that it ends at a half cacheline boundary.

To provide the front end data alignment, the present invention provides an alignment mechanism whereby received data from the switch 140 is first aligned to its correct position. In a selected embodiment, alignment may be achieved by using a left barrel shifter or rotator 75 to move received data (held at buffer 71) into alignment with an offset specified for the buffer start location in memory. The data from the input buffer is then sent through a multiplexer 74 to a rotate shifter 75 which shift rotates the data to generate shifted data and fragment data. The shifted data is then stored in two places. First of all, the shifted start data (that will fit within the lower 16 B of the 32 B memory line that is to be written to memory), after passing through select circuit 76, is fed back for storage in the fragment store register 73, which in this example is the fragment store for the lower half of the memory line (FSL). In addition, the same shifted start data is fed back for storage in the fragment store register 72 so that it can be combined with the next round of incoming data from the input buffer 71.

Figure 11:
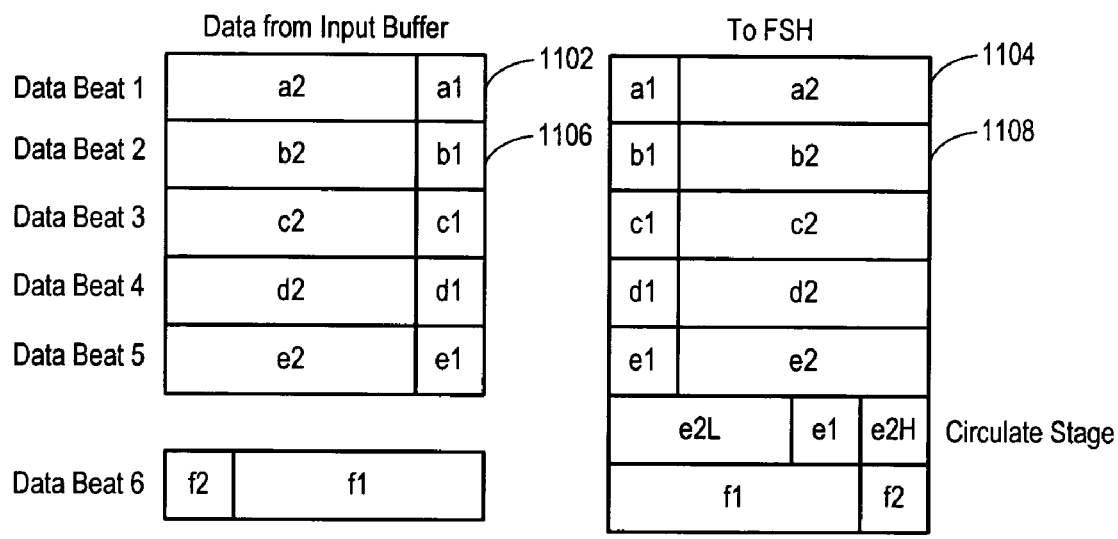
FIG. 11 illustrates an example of the data storage in an input buffer and fragment storage buffer during PMI packet reception.

In particular and as illustrated with reference to FIG. 11, data from the input buffer 71 (e.g., 1106) during a second data beat is sent through a multiplexer 74 to a rotate shifter 75. When data is shifted by rotate shifter 75 under control of the descriptor for this data transfer, only a portion of the data (e.g., shifted data b1) will be transmitted in the upper half of the memory line to the interconnect interface 580, and the remaining data (or data fragment) (e.g., shifted data b2) needs to be retained for use with the next data beat. In particular, when an aligned 16 B data is generated (point C), it may be send out to the interconnect interface 580 through the multiplexer 78 (MUX16), or through buffer 77, or it may be stored in the Fragment Store Low (FSL) register 73 while creating the upper half of the cache line with more data from the packet. Thus, the data fragment for the current cycle (e.g., b2) is sent to a Fragment Store High (FSH) register 72 (point A), as indicated in FIG. 11 at reference numeral 1108. At the same time, the shifted data (e.g., b 1) is merged with the fragment data from the previous cycle at select circuit 76 to generate the upper cache line (point C) and sent to buffer 72 as the upper half of the cache line. In parallel, data placed in the FSL register 73 is sent out through buffer 79 as the lower half of a cache or memory line. When a data fragment from a previous cycle is stored in FSH register 72 (point B) (e.g., 1104), this is used to generate the next 16 B half cache line by merging it with the shifted new data (e.g., data b1 from data 1106) using multiple multiplexers 76 (MUX 1-15) to select and combine the old data (data a2) and new data (data b1) into a single 16 B line that is stored at buffer 77 and transmitted to the interconnect interface 580 along with the lower half of the memory line stored in buffer 79. In particular, when the upper half of the cache or memory line is generated (point C), the FSL register 73 will be read through multiplexer 78 (MUX 16), and both lower half of the cache or memory line (stored in register 79) and the upper half of the cache or memory line (stored in register 77) will be sent to interconnect interface 580.

Figure 12:
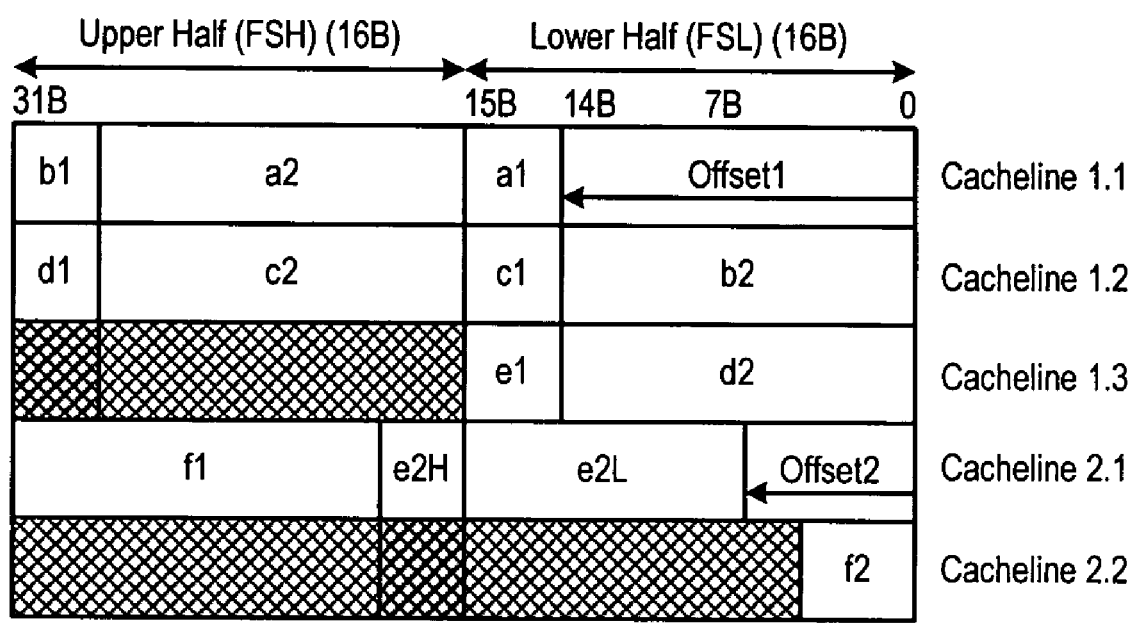
FIG. 12 illustrates an example of the final data placement in memory of a received packet.

FIG. 12 illustrates the final placement of the received data in the memory lines (e.g., cacheline 1.1) by the PMI alignment and merge circuit 70. As illustrated, shifted data a1 is offset from the beginning of cacheline 1.1 by an offset (Offset1) and has been written as part of the lower half of the cacheline 1.1 simultaneously with the upper half of the cacheline 1.1 which contains the data fragment (a2) from the first received packet fragment and the shifted data (b1) from the second received packet fragment. Likewise, cacheline 1.2 consists of an lower half data portion (16B) upper half data portion (16B), where the lower half contains the data fragment (b2) from the second received packet fragment and the shifted data (c1) from the third received packet fragment, while the upper half contains the data fragment (c2) from the third received packet fragment and the shifted data (d1) from the fourth received packet fragment.

As described in this example, memory transfers from the packet manager 540 over the bus 130 are presented as memory lines having a width of 32 B. When descriptor controls of such memory transfers permit an offset of a buffer start address to be any value between 0-31 bytes, and where the length of a packet can be of any size greater than zero, the first line written to memory 340 can have new data in both halves of the line (e.g., cacheline 1.1 in FIG. 12) or only in the lower half (e.g., when the offset and buffer size are small) or only in the upper half (e.g., when the offset is larger than 16 B and it is the first cache line of the buffer). To improve the performance of the data transfer to memory, the controller circuit 584 will make sure that data is sent to the interconnect interface 580 as soon as enough data is collected for one line and data is aligned correctly in that line.

When storage of a packet in memory 340 ends (e.g., when the lower half of cacheline 1.3 is written to memory), the remaining data left in the fragment store 72 (e.g., data e2 in FIG. 11) will be flushed out and written into the memory 340. For that reason, the controller circuit 584 adds an extra flush cycle during which no data is read from the input buffer 71, but the fragment data (e.g., e2) is read and written to the memory. In this embodiment, the designated buffer in memory 340 must be large enough to hold the extra fragment data. If the packet received in FIG. 11 were to end with data beat 4, then d2 in FSH will be flushed out through MUX 76 and MUX 78 to buffer 79 in the flush cycle.

When a memory buffer (e.g., Buffer 1 referenced in FIG. 10) is filled up, but the packet is not yet finished being stored in memory 340, a new buffer is used. This new buffer is obtained from the next descriptor in the descriptor ring. Any data left in the fragment store (e.g., e2 in FSH 72) is realigned to the new offset for the new buffer before the data fragment is written to the new memory buffer. For this realignment, the fragment store (FSH 72) is read and the fragment data is realigned to the new offset (Offset2) using the rotate shifter 75 by sending the fragment data through multiplexer 74 (MUX17), and the realigned fragment data is stored in the FSH register 72. During this realignment, no data will be read from the input buffer 71. To facilitate this recirculation, the controller circuit 584 adds a special circulate cycle to the data process cycles. If the space in the new memory line is larger than the available fragment data, no data will be consumed from the input buffer or fragment store during the circulate stage. Only in the next cycle, when new data is read and combined with the realigned fragment data, will the line will be written to the memory.

Since the starting addresses of each memory buffer can have a different offset, it is possible that the half cache line where the new buffer is located may not have enough space to store all of the fragment data, such as illustrated with reference to cacheline 2.1 in FIG. 12. In this case, during the circulate cycle, some of the realigned fragment data will be consumed. This is illustrated in FIG. 12, where the lower portion (e.g., e2L) of realigned fragment data (e2) will be sent to the memory as the lower half of the new buffer (at cacheline 2.1). The remaining fragment data (e.g., e2H) will be placed in the fragment store FSH 72 for combination with the shifted data (f1) from the next data beat for transmission to memory as the upper half of the new buffer (at cacheline 2.1). As in the previous case, no data will be read from the input buffer during this circulate cycle. The following cycles will be similar to the normal case described before, and data will be read from the input buffer 71 and aligned and merged with the fragment data in the fragment store 72, 73.

Figure 9:
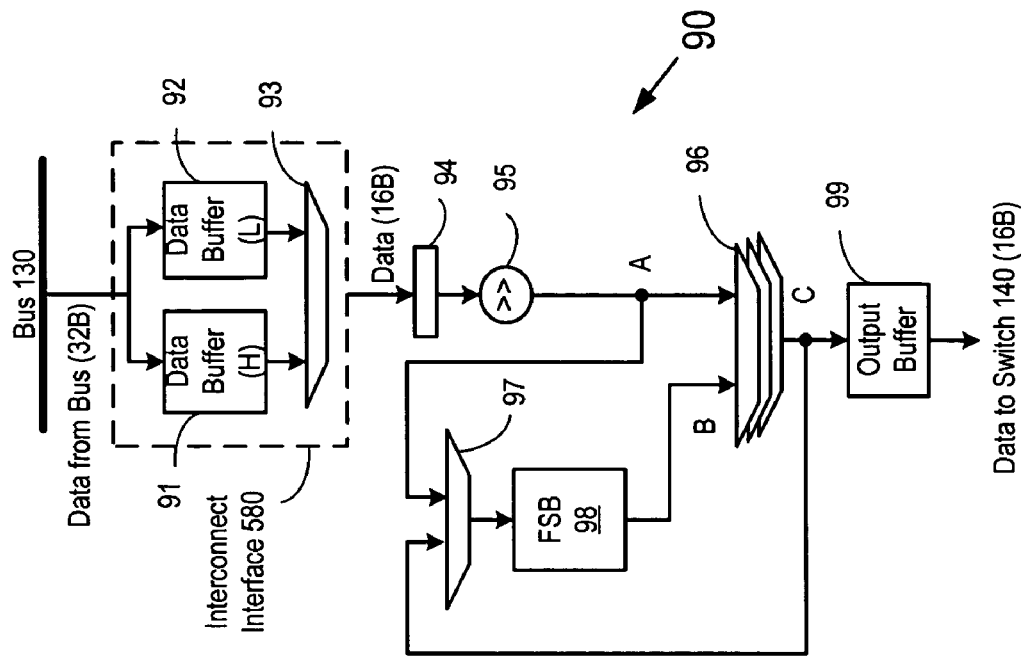
FIG. 9 is a block diagram of the PMO circuit for aligning, accumulating or splitting data in accordance with an embodiment of the present invention.

Turning now to FIG. 9, the alignment data path for the packet manager output circuit 542 is depicted, whereby data from the memory 340 is transmitted via system bus 130 and packet manager to the switch 140. As illustrated, the PMO align/merge/split circuit 90 does the reverse of the data alignment function of the PMI alignment and merge circuit 70. That is, data fetched from memory 340 arrives from the bus 130 having a memory line width of 32B. Since the switch interface 582 is 16B wide, data is converted to 16B chunks by data buffers 91, 92 and MUX 93 in the interconnect interface 580. As with the operation of the PMJ 540, operation of the PMO 542 is controlled by descriptors that specify where the data that is to be transferred is located in the memory 340. The descriptors may specify further that each retrieved buffer can have any offset within a cache or memory line from memory. In addition, when buffers 94 retrieved from memory 340 are smaller than 16B in size, it is possible that after fetching a line from memory 340, there may not be enough data to send out. In this case, the PMO align/split circuit 90 may write partial results into the output buffer 99, or alternatively may accumulate 16B of data before writing them into the output buffer 99. The output buffer 99 may be implemented in a similar fashion as the input buffer 71, as depicted in FIG. 8.

To implement the data accumulate function, the PMO align/split circuit 90 first fetches a memory line of 32B from the bus 130 and stores the line in the buffers 91, 92 in the interconnect interface 580. By providing a 16B bus between the interconnect interface 580 and the PMO 542, wire congestion is reduced. Since the width of the switch 140 is also 16B, the performance of the PMO 542 is not affected. As depicted in FIG. 9, the interconnect interface 580 splits the retrieved memory line into two 16B chunks and sends them separately to the PMO 542 through MUX 93. If data alignment is required to in effect remove an offset from the buffer storage 94 the PMO align/split circuit 90 shifts the data to right using a barrel or rotate shifter 95. The generated data (point A) is merged 97 and stored in the Fragment Store Buffer (FSB) 98, unless there is enough data to write to the output buffer 99. In the next data beat, the new data from the interconnect interface 580 will be shifted and merged through MUX 96 with the data from the FSB 98 (point B) to possibly create a full 16 B of data (point C).

Where very small buffers are described by the output descriptors, it is possible that, even after two data cycles, there are less than 16 B of data available for transmission and the end of the packet is not reached. In this case, then generated data (point C) is merged with generated data (point A) at MUX 97 and rewritten into the FSB register 98 and is re-used in the next data cycle. This recirculation of data can continue until either the end of the packet is reached or 16 B of data is accumulated to write to the output buffer 99. After all data for a packet is read from the memory 340, any remaining data left in FSB 98 will be flushed out as well.

Where data is transferred to or from memory under multiple channels, a selected packet manager implementation of the present invention uses register files to store intermediate values of packets and states for each channel, but flip-flops may also be used here. Alternatively, the present invention may also be used for single channel systems or if packets are processed one at a time. For example, when data is being read by the PMO 542 from memory on multiple channels, the data generated for each channel will be placed in a region allocated for each channel and will be inserted into the tail of the FIFO for that channel.

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. In addition, the FIFO and/or fragment storage buffers can be implemented as flip-flops, as register files or with other storage techniques. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the multi-processor system and/or the data alignment or merging circuitry (e.g., processors, memory controller, bus, packet manager circuit (or portions thereof), switch, receive/transmit interface circuits (or portions thereof), etc.).

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. In an integrated circuit multiprocessor switching device, an apparatus for transferring data from a first bus to a memory bus, comprising:
 a first interface circuit for receiving packet data for a plurality of channels and transferring the packet data on the plurality of channels to a first bus having a first data width;
 a memory bus having a second data width that is larger than the first data width;
 a packet manager circuit coupled between the first bus and the memory bus to transfer data from each of a plurality of channels received from the first interface circuit to memory under control of a corresponding plurality of descriptors, said packet manager circuit comprising,
 an input buffer coupled to the first bus, comprising a buffer region for each of the plurality of channels;
 an alignment circuit coupled to the input buffer for shifting data stored in the input buffer to output shifted data;
 a data merge circuit coupled to the alignment circuit to store in a fragment storage register the shifted data from the alignment circuit that is not written to memory in a first data cycle, said data merge circuit combining data stored in the fragment storage register with data stored in the input buffer in a second data cycle to form a merged data value that is written to the memory bus; and
 a controller for controlling the shifting of data in the alignment circuit in response to an offset contained in a corresponding descriptor and for writing the shifted data to the memory bus.

2. The apparatus recited in claim 1, wherein the merged data value has a data width equal to the first data width.

3. The apparatus recited in claim 1, wherein the merged data value has a data width equal to the second data width.

4. The apparatus recited in claim 1, wherein the input buffer comprises a FIFO buffer.

5. The apparatus recited in claim 1, where the alignment circuit comprises a fragment storage buffer for storing a portion of a first packet fragment that has been stored in the input buffer and shifted to create a first data fragment, whereby the first data fragment is merged with a portion of a second packet fragment that has been stored in the input buffer and shifted to create a second data fragment.

6. The apparatus recited in claim 1, where the packet manager circuit uses register files for storing intermediate values of packets and states for the plurality of channels.

* * * * *